UNITED STATES PATENT OFFICE.

RICHARD HEYDER, OF FOREST HILLS, NEW YORK, ASSIGNOR TO WILLIAMSBURG CHEMICAL COMPANY, INC., OF BROOKLYN, NEW YORK, A CORPORATION OF NEW YORK.

METHOD OF NITRATING CHLORBENZOL.

1,330,074.

Specification of Letters Patent.

Patented Feb. 10, 1920.

No Drawing.   Application filed April 26, 1918.   Serial No. 231,009.

*To all whom it may concern:*

Be it known that I, RICHARD HEYDER, a subject of the Emperor of Germany, residing in Forest Hills, State of New York, have invented an Improvement in Methods of Nitrating Chlorbenzol, of which the following is a specification.

My invention relates to a method of making dinitrochlorbenzol whereby the same is produced economically, without any loss of nitric acid or any evolution of harmful fumes, and with a minimum danger of explosions and of producing harmful contaminating products. One object of the present invention is to produce dinitrochlorbenzol in such form that the same will be particularly adapted for use in manufacturing sulfur black.

Dinitrochlorbenzol has been made in commercial quantities for a long time. In the "*Berichte*," vol. 27, page 2475, of 1894, is given a standard formula for the production of this substance. This formula specifies the use of a nitrating agent comprising, for example, potassium nitrate and sulfuric acid, though obviously any of the usual nitrating agents, such as sodium nitrate and sulfuric acid, or nitric acid and sulfuric acid, may be employed. In working with these or equivalent materials, I have discovered a process whereby I am enabled to considerably shorten the time formerly necessary to complete the desired reaction, my process being economical and safe to operate. The process of my invention also possesses other desirable characteristics which will be subsequently set forth.

By way of example I shall describe a preferred embodiment of the process of my invention in the accompanying specification. While various nitrating agents may be employed, I prefer to use a nitrating agent consisting of a mixture of sulfuric acid and a nitrate, such as sodium or potassium nitrate, preferably the former, in view of its relative cheapness, especially under certain circumstances. This nitrating agent is, of course, generally known and universally employed. For the specific purpose of making a dinitrochlorbenzol having the desirable characteristics already described, I prefer to employ such a mixture in the proportion, for example, of 2800 lbs. of concentrated sulfuric acid and 610 lbs. of sodium nitrate. The sulfuric acid is the ordinary sulfuric acid generally employed in nitration processes and is approximately of a strength corresponding to 66° Baumé. The two substances are mixed in a jacketed, cast iron kettle and the mixing operation usually takes about twenty minutes.

To the above nitrating agent I add about 400 lbs. of chlorbenzol. It will therefore be noted that I employ substantially the calculated theoretical amount of nitrate, since for the proper operation of the process it is highly desirable to avoid any excess whatsoever of nitrate or of the resulting nitric acid. The excess of the nitrate and of the resulting nitric acid tends to produce contaminating products which, while they may not be harmful for other uses of the dinitrochlorbenzol, render the same deleterious in the use of this substance for making sulfur black. Further, such an excess causes the evolution of fumes of oxids of nitrogen and consequent loss of nitric acid, my process altogether avoiding the evolution of any fumes and therefore any loss of nitric acid. Furthermore, the use of such an excess of the nitrate and the consequent formation of an excess of nitric acid, make explosions liable and renders the process rather dangerous, and the multiplication of precautions necessary. The use of such an excess also requires higher temperatures, both for dissolving the nitrate and for keeping the sodium bisulfate formed during the reaction in solution, which aggravates the difficulties already enumerated and also renders essential the multiplication of precautions to prevent explosions.

If the temperature of the nitrating agent is below 25° centigrade it is desirable that it be brought to that point by letting steam into the jacket of the cast iron or other kettle. I prefer to add the chlorbenzol to the nitrating agent slowly and gradually from a storage tank, the chlorbenzol being preferably added to the nitrating agent at a rate substantially corresponding to the rate at which it is used up in the reaction. This results in increasing the rapidity of the reaction and also minimizes the dangers of failure, as by explosion or otherwise. During the time that the chlorbenzol is being added to the nitrating agent, the mixture is thoroughly agitated. For this purpose I prefer to agitate the mixture at or adjacent the meeting surfaces of the layer of nitrating agent and the supernatant layer of mixed dinitrochlorbenzol being produced and of the chlorbenzol being added and about to be converted into the dinitrochlorbenzol. Stirring at the junction of the two layers accelerates the action considerably and results in an economy of the materials employed. In about twenty minutes after the chlorbenzol is first added to the nitrating agent, the temperature of the mixture rises to about 60° centigrade. In this connection it may be stated that the initial, low temperature of 25° centigrade of the nitrating agent is probably rendered practicable because no excess of nitrate is employed. If an excess is employed a higher temperature is necessary to dissolve the nitrate employed. At this point water for cooling is run through the jacket and more chlorbenzol slowly added in such a way that the temperature is kept below 65° centigrade, preferably between about 45° centigrade and 50° centigrade. After the total quantity of 400 lbs. of chlorbenzol has thus been added to the nitrating agent, which takes from four and one half to five hours, the cooling water is turned off and mixing continued for about one hour when the temperature rises to about 60° centigrade.

It will thus be noted that, since the total time necessary to complete the reaction is from eight to eight and one-half hours, and since the mixture described is kept at a temperature below 65° for five and one half to six hours, the temperature of the mixture is kept below 65° during a substantial portion of the entire time necessary to complete the reaction, comprising, in fact, the greater portion of such period of time. In the example given, during practically three quarters and at least between one half and three quarters of the total time necessary for the reaction, the mixture is kept below a temperature of 65°. Higher temperatures are decidedly undesirable, in that contaminating products are produced which render necessary the subsequent purification of the products by laborious methods, a difficulty which is altogether avoided by my process. Furthermore, such high temperatures render explosions probable, and cause the undesirable evolution of the fumes of oxid of nitrogen, disadvantages which are altogether avoided by my process. The evolution of fumes of oxids of nitrogen further indicates a substantial loss of nitric acid. Where a substantially higher temperature than 65° centigrade is maintained in the mixture, dinitrobenzol will be produced, since commercial chlorbenzol generally contains a substantial quantity, usually about 10%, of benzol. Dinitrobenzol is deleterious when present in dinitrochlorbenzol, when the latter substance is to be used for making sulfur black, since it produces a dirty brownish black. On the other hand, if the process of nitration is carried out as described, only mononitrobenzol will be formed which does not produce an undesirable black but is rather apt to give a desirable shade to the sulfur black.

At this point of the process steam is admitted to the jacket and the mixture is now slowly heated for about an hour until a temperature of 95° centigrade is attained, whereupon the steam is turned off and the temperature rises spontaneously by about 10 to 15° centigrade. The mixture is finally heated to 115° to 120° for about two hours until a test portion shows that the nitration is complete. The mixture is then run into water and the precipitated dinitrochlorbenzol is separated. When made according to the foregoing process the substance needs no further purification for use in making a sulfur black of completely desirable characteristics.

As set forth above, my process takes from about eight to eight and one half hours to complete. An evolution of nitrous fumes and consequent waste of nitric acid is altogether avoided. Due to the low temperatures employed, as specified, contaminating products are substantially avoided and danger of explosion is minimized. Furthermore, since substantially the calculated theoretical amount of nitrate is employed, high temperatures need not be used for dissolving the nitrate used, and since no excess of nitrate is therefore employed, evolution of fumes and consequent waste of acid is obviated. The dinitrochlorbenzol thus formed is peculiarly adapted and suitable for the manufacture of sulfur black. It may also be here stated that the surprisingly short time for the completion of the reaction is due to the combination of mass and temperature relations specified.

By practising the process substantially as described, I produce principally the 1:2:4 form of dinitrochlorbenzol. Of the chlorbenzol converted into dinitrochlorbenzol, about 90% is converted into the 1:2:4 form, while the remaining 10% is converted into 1:2:6 form, the 1: position indicating the chlorin atom. The 1:2:4 form is particularly desirable for sulfur black, and the presence of the small amount of the 1:2:6 form does not in any way injuriously affect the material for the various purposes for which it may be employed, especially in the manufacture of sulfur black. It will therefore be noted that by means of my process, I produce substantially only one of the six isomeric forms of dinitrochlorbenzol, with only a relatively small percentage of a second of such six isomeric forms. Furthermore, by means of the temperatures and relative proportions of materials employed, I altogether avoid the formation of trinitrochlorbenzol, which is harmful and dangerous.

In summarizing, it may be stated that the long period of low temperature employed during a substantial portion of the time necessary to complete the reaction, comprising between one-half and three-quarters of such time, probably corresponds to the formation of orthomononitrochlorbenzol, while the comparatively short period of higher temperature probably corresponds to the formation of the dinitrochlorbenzol, comprising largely the 1:2:4 form with a slight admixture of the 1:2:6 form. By the use of the temperature and mass relations described, I am enabled to direct the course of the reaction in the particular direction desired for the production of the orthomononitrochlorbenzol, rather than either or both of the other two isomeric forms of this material, in the first stage of the reaction, and thereafter for the production therefrom, for the greater part, of the 1:2:4 dinitrochlorbenzol, with only a slight amount of the 1:2:6 form of this substance, thereby avoiding the production of any of the other four forms of dinitrochlorbenzol with resulting production of contaminating products and consequent impurity of the dinitrochlorbenzol produced.

Since, as a result of the process of my invention, the product is in a substantially pure form, I do not need to purify the same but may use the dinitrochlorbenzol produced according to my invention directly for the manufacture of a very desirable shade of sulfur black. Furthermore, I make sulfur black from the product resulting from the practice of my process directly and without the previous production of dinitrophenol. For this purpose, I may proceed as follows: I take 100 parts by weight of the dinitrochlorbenzol of my invention and heat the same with 500 to 600 parts by weight of water and 55 parts by weight of any suitable alkali, such as caustic soda. The mixture is heated to 95° C. at which point an exothermic reaction sets in and continues for some time. The mixture is then heated, preferably by being kept at the boiling point, for three to four hours, until all of the oil goes into solution to form sodium dinitrophenate. It will be noticed, therefore, that I do not produce dinitrophenol.

The heated mixture has then added thereto the fused liquid consisting of a fused mixture of 210 parts by weight of sodium sulfid ($Na_2S$) crystals, and 102 parts by weight of sulfur. If fused sodium sulfid is used, the necessary amount of water present in the corresponding quantity of crystals must be added. Preferably the sodium sulfid and sulfur are separately fused, and the fused liquid masses are run slowly, portion by portion, into the hot liquor containing the sodium dinitrophenate. An exothermic reaction sets in, and where, as is preferred, the reaction takes place in a closed receptacle, the outlet valve is left open for about one hour while the mixture is kept in a heated condition, preferably by being boiled. At the end of an hour the outlet valve is closed, and the mixture is heated under pressure for twelve hours to about 120° C. The sulfur black may then be precipitated in substantially pure form by means of any suitable acid material, preferably by means of the waste acid from the nitration step already described. The precipitated mass is filtered, washed, and then dried, whereupon it is ready for use.

Since the nitrating agent, comprising a mixture of sodium nitrate and sulfuric acid, is prepared in advance, said nitrating agent acts substantially in the same manner that the equivalent mixture of nitric and sulfuric acids would act under the circumstances. That is, the nitrate and part of the sulfuric acid form what is equivalent to ordinary nitric acid, said acid not being in the nascent state when used.

It is of course to be understood that my invention is not to be limited to the specific embodiment herein described by way of example merely.

I claim as my invention:

1. A method of making dinitrochlorbenzol which comprises the step of treating chlorbenzol with a nitrating agent while maintaining the temperature of the mixture below about 65° C. during a substantial portion of the time necessary to complete the reaction.

2. A method of making dinitrochlorbenzol which comprises the step of treating chlorbenzol with sulfuric acid and a nitrate while maintaining the temperature of the mixture below about 65° C. during the greater portion of the time necessary to complete the reaction.

3. A method of making dinitrochlorbenzol which comprises the step of treating chlorbenzol with acid and substantially the calculated theoretical amount of a nitrate while maintaining the temperature of the mixture below about 65° C. during a substantial portion of the time necessary to complete the reaction.

4. A method of making dinitrochlorbenzol which comprises the step of treating chlorbenzol with acid and substantially the calculated theoretical amount of nitrate while maintaining the temperature of the mixture below about 65° C. during a period corresponding to between one half and three quarters of the time necessary to complete the reaction.

5. A method of making dinitrochlorbenzol which comprises the steps of gradually adding chlorbenzol to a nitrating agent while maintaining the temperature of the mixture below about 65° C. during a substantial por- 6. A method of making dinitrochlorbenzol which comprises the step of gradually adding chlorbenzol to a mixture of sulfuric acid and a nitrate while maintaining the temperature of the mixture below about 65° C. during a substantial portion of the time necessary to complete the reaction.

7. A method of making dinitrochlorbenzol which comprises the step of gradually adding chlorbenzol to a mixture of sulfuric acid and a nitrate while maintaining the temperature of the mixture below about 65° C. during a substantial portion of the time necessary to complete the reaction, said chlorbenzol being added at a rate substantially equal to the rate at which this substance is used up in the reaction.

8. A method of making dinitrochlorbenzol which comprises the steps of gradually adding chlorbenzol to a mixture of sulfuric acid and a nitrate while maintaining the temperature of the mixture below about 65° C. during a substantial portion of the time necessary to complete the reaction, and agitating the mixture.

9. A method of making dinitrochlorbenzol which comprises the steps of gradually adding chlorbenzol to a mixture of sulfuric acid and a nitrate while maintaining the temperature of the mixture below about 65° C. during a substantial portion of the time necessary to complete the reaction, and agitating the mixture adjacent the upper surface of the layer of the nitrating agent.

10. A method of making dinitrochlorbenzol which comprises the step of gradually adding chlorbenzol to a mixture of sulfuric acid and substantially the calculated theoretical quantity of nitrate while maintaining the temperature of the mixture below about 65° C. during a substantial portion of the time necessary to complete the reaction, said chlorbenzol being added at a rate substantially equal to the rate at which this substance is used up in the reaction.

In testimony whereof, I have signed my name to this specification this 25th day of April 1918.

RICHARD HEYDER.